United States Patent [19]

Medendorp

[11] 3,960,471

[45] June 1, 1976

[54] CONTAINER MOLDING APPARATUS

[75] Inventor: Roger L. Medendorp, Grand Rapids, Mich.

[73] Assignee: Kirkhof Manufacturing Corporation, Grand Rapids, Mich.

[22] Filed: Dec. 23, 1974

[21] Appl. No.: 535,179

[52] U.S. Cl. .................................. 425/388; 264/92
[51] Int. Cl.² ........................................ B29C 17/03
[58] Field of Search ........... 425/388, 391, 398, 384, 425/438, 418, 457, 812, 437, 468, 125, 124, 383, 329 R, DIG. 458, 457; 264/92

[56] References Cited
UNITED STATES PATENTS

| | | | |
|---|---|---|---|
| 2,784,455 | 3/1957 | Pulaski | 425/384 |
| 3,058,153 | 10/1962 | Busch | 425/388 |

Primary Examiner—R. Spencer Annear
Assistant Examiner—Robert J. Charvat
Attorney, Agent, or Firm—Price, Heneveld, Huizenga & Cooper

[57] ABSTRACT

Mold apparatus for vacuum forming sheet material, especially sheet plastic, including withdrawable projections which project into the mold cavities to form depressions or projections in the resulting molded item and are withdrawable to allow removal of the molded item. Sealing means, such as an "O" ring, on each projection, are included to prevent loss of vacuum through the mold walls around the projections. Counter-rotational camming means are provided for simultaneously projecting or withdrawing a plurality of the said projections either on one mold or on adjacent molds.

23 Claims, 9 Drawing Figures

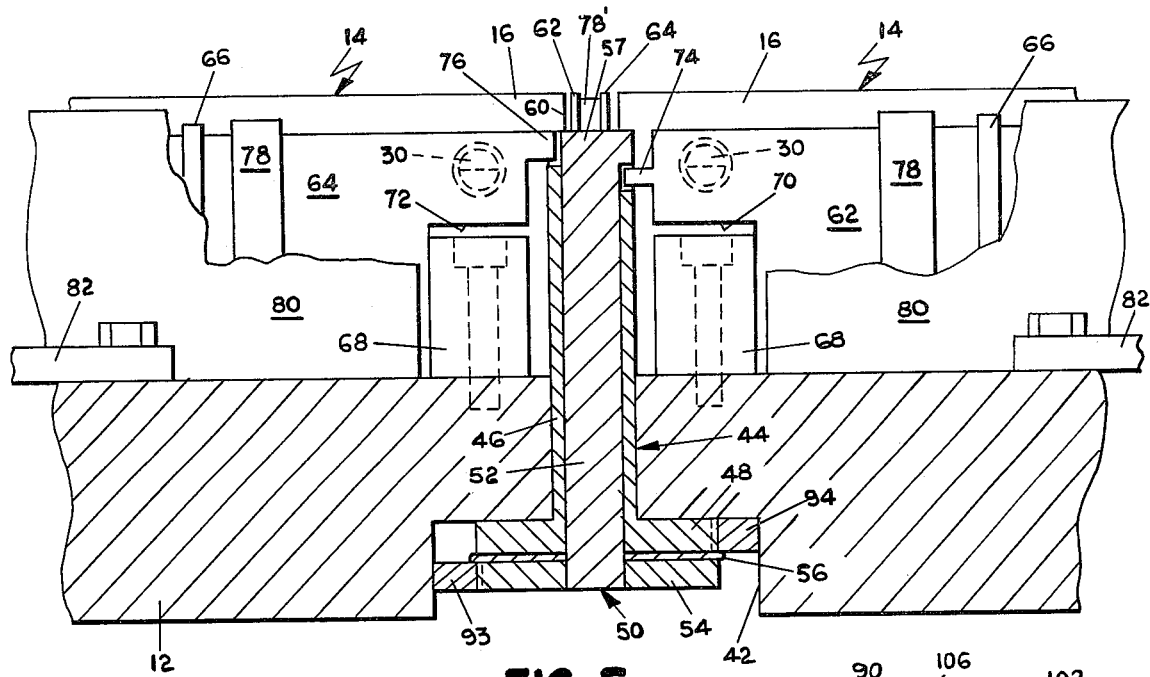
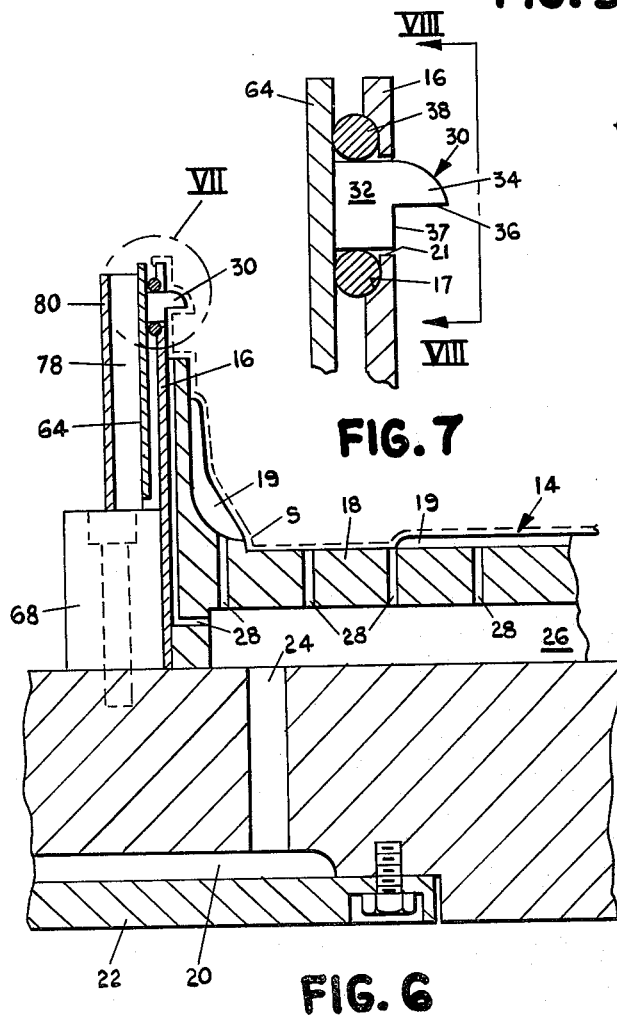
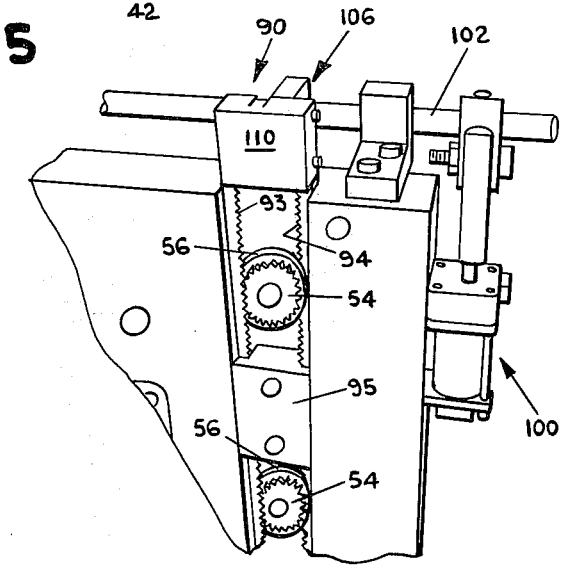
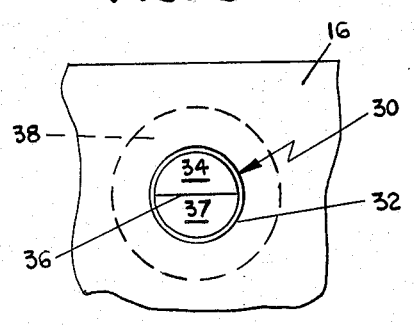

CONTAINER MOLDING APPARATUS

BACKGROUND OF THE INVENTION

This invention relates to a vacuum-forming molding apparatus and, more particularly, to molding apparatus especially adapted to form containers and other items from sheet materials such as plastic. The molded items are of the type which include projections or depressions which would normally cause difficulty in their removal from the mold.

Various methods and apparatus for vacuum forming items having depressions or projections therein have been devised. In the past, the necessity of providing a solid object around which the projection or depression is formed in the item has created a problem of removing the finished vacuum-formed item after molding. In some vacuum-forming apparatus, the mold itself is formed in two or more parts which are physically separated after molding to allow removal of the finished product. Obviously, the necessity of moving the mold parts away from one another creates complex designs and greater expense.

In such molding apparatus which are especially designed to form various items using vacuum, the problem of retaining sufficient vacuum to draw the material around the desired projection presents other problems in addition to that of removing the finished item. In certain prior apparatuses, projections which are movable through the mold walls for insertion upon molding and withdrawal upon removal of the finished item have been presented. With such devices, it has been found necessary to provide a negative pressure around the projections to ensure proper forming of the item. However, the necessity of providing such negative pressure adds complexity and expense to the apparatus. Further, the pressure around the entire mechanism for inserting and withdrawing the projection must be carefully controlled.

A related problem is that of forming a plurality of vacuum-formed items each including a plurality of depressions or projections while maintaining simplicity in the overall molding mechanisms. Such simplicity both increases the useable life of the apparatus and reduces any necessary maintenance.

A solution to the above problems has been found in the present invention. The invention provides an easily maintained, reliable apparatus for vacuum forming sheet material into containers and other molded items including depressions or projections therein while allowing the easy removal of the finished items after the vacuum-forming step. The invention eliminates the need for complex pressure control around the depression-forming members while allowing the simultaneous forming of a plurality of products in several adjacent molds by utilizing centralized, depression-forming mechanisms.

SUMMARY OF THE INVENTION

Accordingly, it is an object and purpose of the present invention to provide molding apparatus for vacuum-forming sheet material, and especially sheet plastic material, into items or products having depressions or projections formed therein which would normally prevent the removal of the finished product from the mold. The invention includes one or more movable projecting members for insertion and withdrawal from one or more mold cavities. The depressions or projections in the finished items are formed upon insertion of the projecting members into the mold cavities. The finished items are removed following withdrawal of the projecting members from cavities. Means for sealing each of the projecting members to prevent escape of the vacuum required for forming the products are included. Mechanisms for simultaneously moving a plurality of the projections on a single mold or a plurality of projections on a plurality of molds are also provided.

In one aspect, a mold apparatus is provided for vacuum forming an article from sheet material comprising a base, and a mold mounted on the base including upstanding side walls forming a mold cavity. A projecting member is provided with an aperture in at least one of the side walls of a mold. Means are provided for moving the projection through the aperture to form the sheet material therearound as the projection extends through the aperture and to allow removal of the molded item after the forming step and while the projection is withdrawn. Sealing means are included for sealing the aperture around the projection to prevent air flow through the aperture to or from the the mold cavity when the projecting member is inserted therein during the molding process.

In other aspects of the invention, rotatable camming are located between the means for moving the projecting members into and out of the mold cavities for simultaneously inserting and withdrawing a plurality of projecting members. In the preferred embodiment, the camming means are counter-rotational and move a plurality of projections either with respect to one mold or with respect to two or more molds mounted adjacent one another.

These and other objects, advantages, purposes, and features of the invention will become more apparent from a study of the following description taken in conjunction with the drawings.

BRIEF DESCRIPTION OF THE DRAWINGS

FIG. 5 is a fragmentary, sectional view of the projection camming means taken along plane V—V of FIG. 2;

FIG. 6 is a fragmentary, sectional view of one mold cavity and one of the cammed projecting members taken along plane VI—VI of FIG. 2;

FIG. 7 is an enlarged fragmentary, side view of one of the cammed projecting members and the sealing means therefor;

FIG. 8 is a fragmentary, front view of the projection taken along plane VIII—VIII of FIG. 7; and FIG. 9 is a fragmentary, perspective view of the bottom one corner of the molding apparatus illustrating a portion of the mechanism for rotating the camming apparatus.

DESCRIPTION OF THE PREFERRED EMBODIMENT

Figure 1:
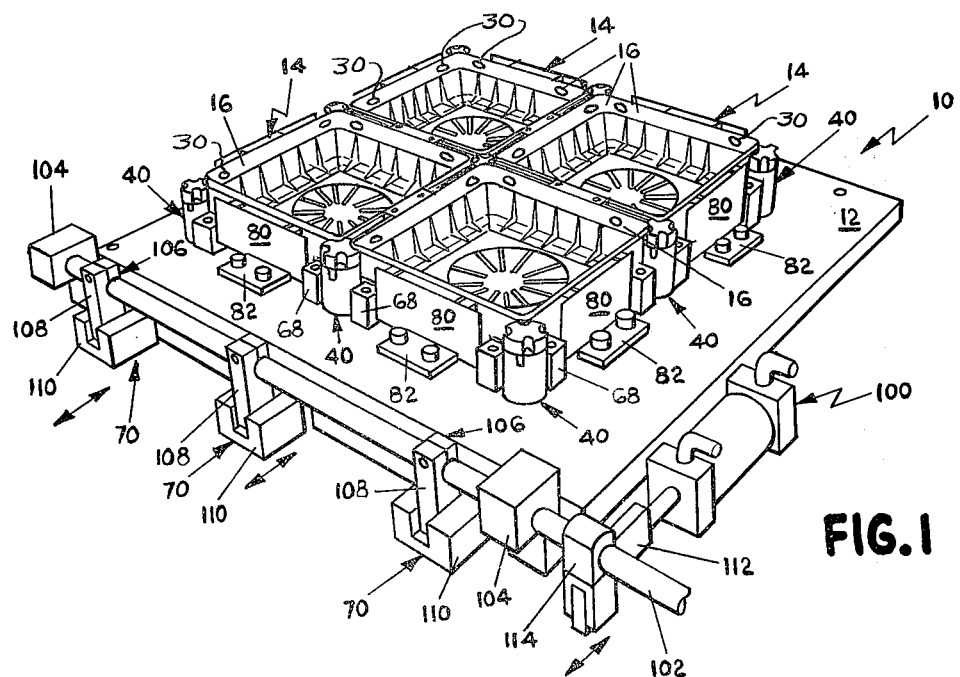
FIG. 1 is a perspective view of the molding apparatus of the present invention.

Referring now to the drawings in greater detail, FIG. 1 illustrates the mold apparatus 10 including a generally planar, rectangular base plate 12 and four molds 14 mounted thereon. The molds 14 are spaced slightly from one another and are generally located in the four corners of a square. Each mold includes upstanding side walls 16 and a bottom portion 18 forming a mold cavity.

Figure 3:
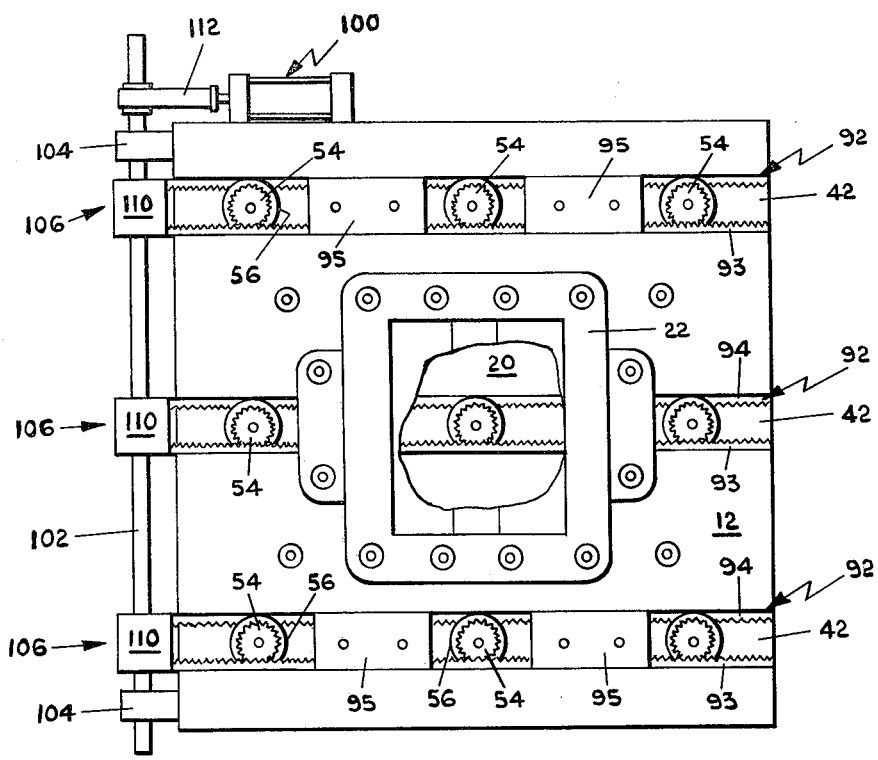
FIG. 3 is a bottom plan view of the molding apparatus shown in FIGS. 1 and 2 with portions thereof broken away.

As is best seen in FIG. 6, each mold 14 is of the type designed to vacuum form a sheet of material into the configuration formed by the mold side and bottom walls 16 and 18 as shown by the dotted outline in FIG. 6. The illustrated molds form the tops for lightweight plastic containers for fruit, vegetables, and the like. Preferably, the sheet material used is a thermoplastic polystyrene having a thickness of between about 0.005 and 0.010 inches. Of course, other types of sheets can be used. In order to draw the flat sheet material "S" downwardly into the mold cavity from its starting position, where it is laid generally across the top of the mold side wall 16, to the molded position shown by the dotted lines in FIG. 6, a plurality of vacuum passageways are provided. Thus, a vacuum chamber 20 is provided in the bottom of base 12 and covered by a suitable cover plate 22 (FIGS. 3 and 6). Fluid passageways 24 lead from chamber 20 to vacuum chambers 26 formed in the bottom of the respective molds 14. A plurality of fluid passageways 28 extend through the body of mold 14 from chamber 26 to the mold cavity along through both the bottom and side walls thereof. When chamber 20 is evacuated by suitable apparatus (not shown), air is withdrawn through passageways 24 and 28 and chamber 26 such that the sheet "S" is drawn by the pressure differential downwardly into the mold cavity. Tapered, rounded projections 19 may be provided along the sides and bottom of the mold to form structural ribbing to strengthen the resulting product.

Figure 2:
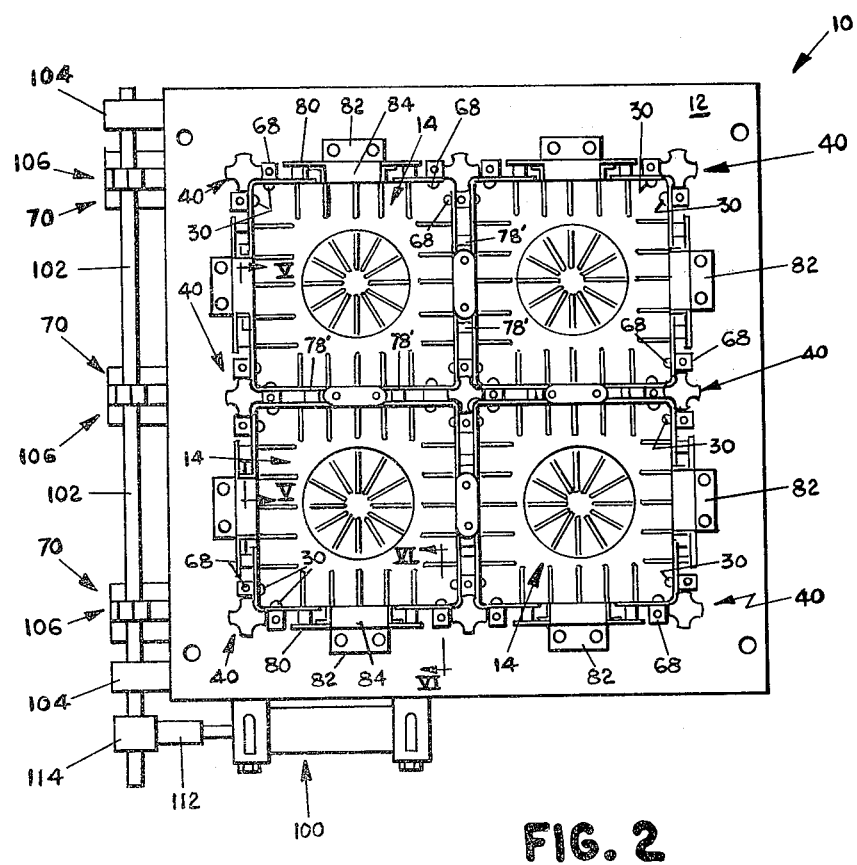
FIG. 2 is a top plan view of the molding apparatus shown in FIG. 1.

A principal aspect of the present invention resides in the provision of movable projections or projecting members 30 (FIGS. 1, 2, and 5–8) which are inserted and withdrawn through apertures 21 in the upstanding side walls of the mold 14 by camming mechanisms 40. Camming mechanisms 40 are provided adjacent each corner of the molds such that each camming mechanism simultaneously inserts and withdraws at least a pair of projections 30 on different side walls of the same mold or a plurality of projections on one or more side walls of either two or four of the molds. As shown in FIGS. 1, 2, and 9, the camming mechanisms 40 are rotated by a series of three rack and pinion assemblies 90 mounted in the underside of base plate 12. The rack and pinion assemblies 90 are in turn powered by a single fluid cylinder 100.

Figure 4:
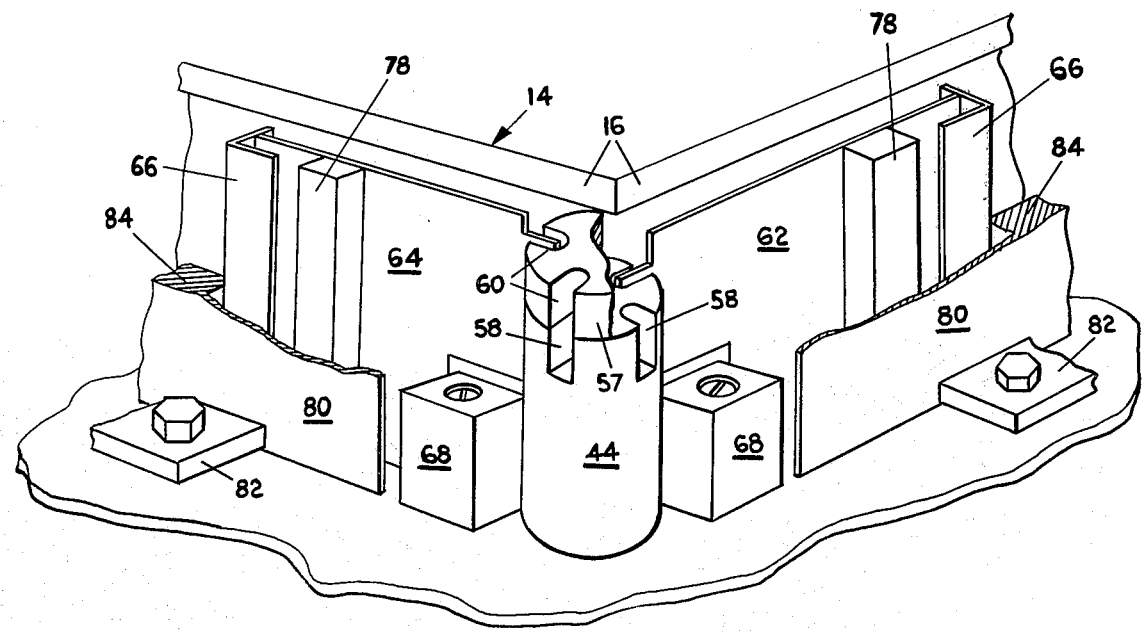
FIG. 4 is a fragmentary, enlarged, perspective view of the camming apparatus for moving the projecting members into and out of one mold cavity.

Referring to FIGS. 4–6, each of the camming mechanisms 40 extends upwardly through base 12 from a recessed channel 42 on the bottom side thereof upwardly along one or more corners of the molds 14. Each camming mechanism is a counter-rotational assembly including an outer tubular member 44 and an inner shaft member 50 extending coaxially upwardly through tubular member 44. Member 44 includes an upstanding hollow cylindrical portion 46 merging into a integrally formed gear 48 resting against the top of recess 42. Shaft member 50 includes an upstanding solid circular cylindrical shaft 52. A separately formed gear disc 54 is secured on the bottom of shaft 52 beneath gear 48. To facilitate counter-rotation, gear 48 is separated from gear 54 by a gear 54 by a bearing disc 56 formed from brass or another suitable bearing material. Shaft 52 is longer than cylindrical portion 46 such that it extends above the end of cylinder 46. A cylindrical cap 57 is formed at the top of shaft 52 having the same diameter as the outside diameter of cylindrical portion 46 such that shaft 52 is supported by the end of portion 46. As will be more fully described below, the rack of one of the rack and pinion assemblies 90 simultaneously counter-rotates members 44 and 50 via gears 54 and 48. The upper portions of each of the members 44 and 50 include four generally semi-circular recesses 58 and 60, respectively, which engage plates for pivoting the projections 30 into and out of the mold cavities as described below.

As shown in FIGS. 5–7, each of the projections 30 is mounted on and extends generally normally outwardly from a generally vertical plate 62 or 64. Plates 62 are mounted adjacent the exterior wall on the right-hand side of a mold corner (when viewed as in FIG. 4) while plates 64 are mounted on the left-hand side. One of the camming mechanisms 40 extends upwardly adjacent the corner of the mold generally between the plates 62 and 64. Each side of the several molds includes one each of plates 62, 64 (FIGS. 1 and 2) extending oppositely for movement of a pair of projecting members 30 on each side. Each of the plates 62, 64 is mounted for horizontal, pivotal movement about a generally vertical axis via an L-shaped channel member 66. Channel members 66 are welded to the side wall 16 of the mold and extend out and over the end edge of each of the plates which is farthest from the camming mechanism 40. Each of the plates 62, 64 is prevented from sliding out of its respective channel member 66 by a block 68 fastened to the base 12 with a suitable machine screw as shown in FIGS. 5 and 6. For the plates 62, 64 between the sides of adjacent molds, a single block 68 secured between such sides retains two adjacent plates (FIG. 2). Blocks 68 are received in rectangular recesses 70, 72, respectively, formed in the edges of the plates closest to the camming mechanisms. Each of the plates 62, 64 also includes a tongue or flange 74, 76 respectively. Tongues 74 from plate 62 are received in recesses 58 in tubular members 44 while tongues 76 are spaced farther from base 12 and received in recesses 60 in cap portion 57 of shaft 50.

Each of the plates is biased toward the side wall 16 of mold 14 by a biasing assembly adjacent each side wall or between adjacent side walls. As shown in FIGS. 1, 2, and 4–6, the plates 62 and 64 adjacent the outermost exterior walls of the molds are biased toward the side walls 16 by elongated, generally vertically extending resilient rubber pads 78. Each of the pads is held in place by plates 80 which overlap the ends of plates 62, 64 along one side of each mold. Plates 80 in turn include horizontally extending flanges 82 on their exterior surfaces which allow the plates to be bolted to top of base 12 as well as spacing portions 84 extending from the plate 80 to side wall 16 of each mold between channel members 66. Spacing portions 84 both locate the molds on the base 12 as well as locate plates 80.

As best seen in FIG. 2 when the molds are mounted in groups, biasing means are also included between the adjacent walls of the several molds which face one another. In these areas, resilient pads 78' extend vertically along two opposing plates 62, 64 on opposing corners of the facing molds. Further, spacer blocks 81 are secured between the adjacent molds to both position the resilient pads 78 as well as to maintain the proper positions of the molds 14. Thus, counter-rotation of the tubular member 44 and shaft 50 which engages tongues 74, 76 of plates 62, 64, respectively, in recesses 58 and 60 simultaneously pivots plates 62 and 64 and thus projections 30 thereon either away from the side walls 16 of molds 14 and against the bias of pads 78 and 78' or toward those side walls with the bias of the resilient pads.

Although the pivotal plates 62, 64 are retained in place by channels 66 and blocks 68, they may be simply removed for access to the projections 30 or maintenance of other parts by removing plates 80 or spacers 81, pads 78 or 78', and blocks 68. Thereafter, plates 62 and 64 may be slid from channels 66.

Referring to FIGS. 7 and 8, each of the projections 30 is welded or otherwise fastened to extend normally and inwardly from the interior surface of one of the plates 62, 64. The projections include right, circular cylinders 32 having quarter-spherical extensions 34 thereon. The quarter-spherical extension is formed by making the end of the projection 30 hemispherical after which half of that end is cut away. Sections 34 provide a flat surface 36, which forms a retaining surface in the molded container top, and a surface 37 which fits flush with the interior mold wall. It will be obvious to those skilled in the art that the projections 30 can be formed with other configurations as desired for the particular design of the molded item.

As seen in FIGS. 6–8, each of the projections 30 includes a resilient sealing gasket or member 38 preferably in the form of an "O" ring telescoped over the smooth exterior surface of the cylindrical body portion 32 of the projection 30 and movable therewith. The sealing "O" rings 38 cooperate with annular, rounded recesses 17 which are formed on the exterior surfaces of side walls 16 coaxially with apertures 21. As shown in FIG. 7, the annular recesses 17 are of sufficient depth to position projections 30 with surfaces 37 flush with the interior surface of the side wall while quarter-spherical portions 34 extend into molding position in the mold cavity. When a vacuum is formed within the mold cavity, "O" 38 prevent the loss of vacuum through the slightly oversized apertures 21 in the side walls.

Referring now to FIGS. 1–3 and 9, the rack and pinion assemblies 90 as well as the means for powering those rack and pinion assemblies are shown in greater detail. Base 12 is provided with a series of three recesses 42 across its bottom. Each recess includes an elongated gear rack 92 extending longitudinally therethrough and having opposing, facing banks of gear teeth 93 and 94. As is seen in FIG. 5, one of the opposing banks of teeth 93 is spaced below the bearing disc 56 and engages gear 54. The remaining bank of gear teeth 94 is located above the gear disc 56 in registry with the teeth on gear portion 48 of tubular member 44. Retaining plates 95 are provided and secured to the bottom of the recesses at spaced points between the bottoms of camming mechanisms 40 to hold the racks in recesses 42 but allow their sliding movement for rotation of the camming mechanisms.

Power is provided to slide the racks simultaneously toward one side of the base 12 by a fluid cylinder 100 linked to a rotatable rod 102. As seen in FIGS. 1–3 and 9, rod 102 is rotatably mounted in generally L-shaped mounting members 104 secured at either end of one edge of the base 12. Rod 102 extends through members 104 parallel to that edge and generally transverse to the direction of extensions of recesses 42 and racks 92.

Fixed along rod 102 at spaced points in alignment with the recesses and racks are pivot mechanisms 106 each including a connecting arm 108 fixed to rod 102 at one end and pivotally secured in a rack extension 110 at its other end. A conventional pneumatic fluid cylinder 100 is secured to an adjacent edge of base 12 and includes a piston extension 112 pivotally connected to a connecting arm 114 which is fixedly secured to an extending end of rod 102.

Extension and retraction of the piston within cylinder 100 simultaneously rotates rod 102 via extension 112 and connecting arm 114. Rotational movement of rod 102 simultaneously rotates connecting arms 108 which in turn reciprocate rack extensions 110 and racks 92 in recesses 42. The reciprocal movement of the racks 92 in turn counter-rotates gears 54 and 48, i.e., rotates those gears in opposite rotational directions. Such counter-rotational movement is transferred via members 44 and 52 to the pivotal plates 62, 64 which in turn move the projections 30 simultaneously either into or out of the mold walls.

Although the present invention has been described in the preferred embodiment with reference to four molds mounted on base plate 12, it will be obvious to those skilled in the art that the base plate could be made larger and additional molds mounted adjacent the outside walls of the outer molds in this preferred embodiment. In such case, a plurality of the camming mechanisms 40 would pivot four plates 62, 64 on the walls of four molds in the same manner that the centralmost camming mechanism shown in the present invention operates four of those pivotal plates on four molds. Further, with additional molds and camming mechanisms, rod 102 could be extended and additional recesses and racks added beneath the base plate to simultaneously operate the additional camming mechanisms from the same fluid cylinder.

Therefore, as will now be apparent, the present invention provides a molding apparatus for vacuum forming sheet material such as plastic including apparatus for forming projections and depressions therein. The camming mechanisms 40 are designed for efficient operation of the pivotal projections on several molds at the same time and yet are susceptible of easy maintenance and repair due to their construction. Further, the projections themselves are much simplified over prior known mechanisms because of the inclusion of the sealing means which obviates the necessity for complex vacuum chambers around each cammed projection.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

I claim:

1. Molding apparatus for vacuum forming an article from sheet material comprising a base; at least one mold mounted on said base, said mold having upstanding side walls and a bottom defining a mold cavity, means defining an aperture in one of said side walls, a vacuum chamber, and a plurality of fluid passageways connecting said vacuum chamber with said mold cavity; said base including fluid passageways communicating with said vacuum chamber for evacuating said chamber and mold cavity when a sheet to be molded is laid across the top of said mold; a molding projection;

insertion means adjacent said aperture for inserting said projection through said aperture to form the sheet material therearound including plate means supporting said projection for moving said projection through said side wall, sealing means for sealing said aperture around said projection to prevent fluid flow through said aperture when said projection is inserted therein, and camming means for moving said plate means to insert and remove said projection from said aperture.

2. The mold apparatus of claim 1 wherein said sealing means include an "O" ring extending around said projection and located between said plate means and mold side wall when said projection is inserted through said aperture.

3. The mold apparatus of claim 1 wherein said plate means includes a generally planar plate and means for mounting said plate for pivotal movement about a generally vertical axis adjacent said mold side wall; said projection extending in registry with said aperture from the plate surface closet said side wall; resilient biasing means for biasing said plate toward said side wall.

4. The mold apparatus of claim 1 wherein said base includes a second mold mounted thereon having upstanding side walls forming a second mold cavity, and means defining a second aperture in one of said side walls of said second mold; a second molding projection; means for inserting said second projection through said second aperture including second plate means for moving said second projection through said side wall of said second mold and sealing means for sealing said aperture when said second projection is inserted; said camming means located between and engaging said plate means and second plate means for simultaneously moving both of said plate means to simultaneously insert or withdraw said projections into or from said respective molds.

5. The mold apparatus of claim 4 including counter-rotational camming means for simultaneously moving said plate means and second plate means in opposite rotational directions to simultaneously insert or withdraw said projections into or from said respective molds.

6. Mold apparatus for vacuum forming an article from sheet material comprising a base; a mold mounted on said base including upstanding side walls forming a mold cavity; means defining an aperture in at least one of said side walls a molding projection movably mounted adjacent said aperature; insertion and withdrawal means adjacent said aperture and one side wall for moving said projection through said aperture into and out of the mold cavity to form the sheet material therearound and to allow removal of the molded item after molding; and sealing means engaging and extending between said one side wall around said aperture and said projection when it is inserted through said aperture for completely sealing said aperture around said projection and preventing air flow through said aperture to or from said mold cavity when said projection is inserted therein.

7. The mold apparatus of claim 1 wherein said sealing means includes a gasket extending around said projection and adapted to cover and seal any gap between said aperture and projection.

8. The mold apparatus of claim 2 wherein said projection is generally cylindrical, said gasket comprising an "O" ring extending therearound.

9. The mold apparatus of claim 6 wherein said insertion and withdrawal means for moving said projection include a first upstanding member mounted for pivotal movement about a generally vertical axis immediately adjacent said side wall including said aperture; said projection extending inwardly toward said side wall from said first member; rotatable camming means adjacent said first member engaging said member for pivoting said first member and projection about said axis toward and away from said side wall.

10. The mold apparatus of claim 4 including rack and pinion means in said base for rotating said rotatable camming means.

11. The mold apparatus of claim 4 wherein said sealing means include a gasket extending around said projection to cover any gap between said projection and aperture when said projection is inserted, said gasket being located between said upstanding member and side wall when said projection is inserted.

12. The mold apparatus of claim 9 including a second upstanding member mounted for pivotal movement about a second generally vertical axis immediately adjacent another portion of said side wall, said second member including a second projection extending inwardly toward said side wall therefrom; said other portion of said side wall including means defining a second aperture through which said second projection is inserted into said mold cavity; sealing means on said second projection for sealing said second aperture around said second projection; said rotatable camming means including counter-rotating camming means located intermediate said first and second members for simultaneously pivoting said first and second members and said first and second projections in opposite rotational directions toward or away from said respective side wall portions for inserting or withdrawing said first and second projections into or from said respective apertures.

13. The mold apparatus of claim 9 including resilient biasing means engaging said upstanding member for biasing said member toward said side wall.

14. The mold aperture of claim 6 including a second mold mounted on said base and having upstanding side walls forming a second mold cavity; a second projection; an aperture in said side walls of said second mold; sealing means for sealing said aperture around said second projection; and means for moving said second projection into and out of said aperture in said second mold; rotatable camming means located between said means for simultaneously moving said first and second projections for simultaneously inserting and withdrawing both of said projections into and from said respective molds.

15. Mold apparatus for vacuum forming an article from sheet material comprising a base; a mold mounted on said base including upstanding side walls forming a mold cavity; said side walls including means defining a pair of apertures therethrough; a pair of projections; movable support means for movably supporting one of said projections adjacent each of said apertures; insertion and withdrawal means for moving said support means and, thus, inserting and withdrawing said projections from their respective aperture including counter-rotational camming means for simultaneously moving said support means, and, thus, inserting or withdrawing both of said projections into or from said apertures; said counter-rotational camming means including coaxial first and second means for simultaneously rotating said respective support means in opposite rotational directions whereby said projections are inserted to form the sheet material therearound during molding and are withdrawn to allow removal of the molded item from the mold cavity.

16. The mold apparatus of claim 15 including sealing means for sealing any gap between said projections and the respective apertures when said projections are inserted into said mold cavity.

17. The mold apparatus of claim 16 wherein said sealing means comprise gaskets extending around said projections.

18. The mold apparatus of claim 17 wherein said projections are cylindrical, said gaskets including an "O" ring fitted over each cylindrical projection.

19. The mold apparatus of claim 15 wherein said support means include a pair of pivot means for pivoting said projections, each of said pivot means located adjacent one of said apertures for pivoting toward and away from said side wall, one of said projections extending inwardly from each of said pivot means in registry with one of said apertures; engaging means on one of said pivot means for engaging said first means on said camming means; said other pivot means including engaging means for engaging said second means on said camming means whereby rotation of said camming means pivots said pivot means for insertion or withdrawal of said projections into or from said mold.

20. The mold apparatus of claim 19 wherein said counter-rotational camming means is mounted between said pair of pivot means and includes a tubular member rotationally mounted in said base and a shaft member extending coaxially through said first tubular member and mounted for rotation therein, said tubular and shaft members each including a recess; said engaging means on one of said pivot means received in said recess in said tubular member, said engaging means on the other of said pivot means received in said recess in said shaft member; rack and pinion means in said base including means for reciprocating said rack means for rotating said tubular and shaft members in opposite directions for simultaneous insertion and withdrawal of said projections.

21. Mold apparatus for vacuum forming an article from sheet material comprising a base; a mold mounted on said base including upstanding side walls forming a mold cavity; said side walls including means defining a pair of apertures therethrough;
 a pair of projections;
 inserting and withdrawal means for inserting and withdrawing said projections into and from said apertures including counter-rotational camming means adjacent said side walls for simultaneously inserting or withdrawing both of said projections into or from said apertures whereby said projections are inserted to form the sheet material therearound during molding and are withdrawn to allow removal of the molded item from the mold cavity;
 said inserting and withdrawing means including a pair of pivot means for pivoting said projections, each of said pivot means located adjacent one of said apertures in said side walls for pivoting toward and away from said side wall; one of said projections extending inwardly toward said aperture from each of said pivot means and being in registry with one of said apertures; engaging means on each of said pivot means for engaging a portion of said camming means whereby rotation of said camming means pivots said pivot means for insertion or withdrawal of said projections into or from said mold;
 said counter-rotational camming means being mounted between said pair of pivot means and including a tubular member rotationally mounted in said base and a shaft member extending coaxially through said first tubular member and mounted for rotation therein, said tubular and shaft members each including a recess; said engaging means on one of said pivot means received in said recess in said tubular member, said engaging means on the other of said pivot means received in said recess in said shaft member;
 rack and pinion means in said base including means for reciprocating said rack means for rotating said tubular and shaft members in opposite directions for simultaneous insertion and withdrawal of said projections;
 said pivot means being generally planar plates mounted for pivotal movement about generally vertical axes adjacent said side walls, said projection on each extending from the plate surface adjacent said side wall, said engaging means on each pivot means including a flange extending from said plate into said respective recess.

22. The mold apparatus of claim 21 including resilient biasing means for biasing said plates toward said side walls.

23. Molding apparatus for vacuum forming an article from sheet material comprising a base; at least one mold mounted on said base, said mold having upstanding side walls and a bottom defining a first mold cavity, means defining a first aperture in one of said side walls, a vacuum chamber, and a plurality of fluid passageways connecting said vacuum chamber with said first mold cavity;
 said base including fluid passageways communicating with said vacuum chamber for evacuating said chamber and first mold cavity when a sheet to be molded is laid across the top of said mold;
 a first molding projection;
 first means for inserting said first projection through said first aperture to form the sheet material therearound including first plate means supporting said first projection for moving said projection through said first aperture, first sealing means for sealing said first aperture around said projection to prevent fluid flow through said first aperture when said projection is inserted therein, and camming means for moving said plate means to insert and remove said projection from said first aperture;
 said base further including a second mold mounted thereon having upstanding side walls forming a second mold cavity and means defining a second aperture in one of said side walls of said second mold;
 a second molding projection;
 second means for inserting said second projection through said second aperture in said side wall of said second mold including second plate means supporting said second projection for moving said second projection through said second aperture and second sealing means for sealing said second aperture when said second projection is inserted;
 a third projection;
 a third plate means supporting said third projection for moving said third projection through means defining a third aperture located in said side walls of said first mold; third sealing means for sealing said third aperture when said third projection is inserted;
 said camming means located between and engaging said three plate means on said two molds for simultaneously moving said three plate means to insert or withdraw said three projections into or from said respective apertures in said respective molds.

* * * * *

UNITED STATES PATENT AND TRADEMARK OFFICE
CERTIFICATE OF CORRECTION

PATENT NO. : 3,960,471
DATED : June 1, 1976
INVENTOR(S) : Roger L. Medendorp

It is certified that error appears in the above-identified patent and that said Letters Patent are hereby corrected as shown below:

Column 2, line 25;
    After "camming" insert --means--;
Column 3, line 67;
    After "54" omit --by a gear 54--;
Column 5, line 41;
    After "O" insert --rings--.

Signed and Sealed this

Twenty-first Day of September 1976

[SEAL]

Attest:

RUTH C. MASON
*Attesting Officer*

C. MARSHALL DANN
*Commissioner of Patents and Trademarks*